United States Patent [19]
Hiraga et al.

[11] Patent Number: 5,600,780
[45] Date of Patent: Feb. 4, 1997

[54] PROGRAMMING ENVIRONMENT SYSTEM FOR CUSTOMIZING A PROGRAM APPLICATION BASED UPON USER INPUT

[75] Inventors: Rumi Hiraga, Matsudo; Yeong-chang Lien, Tokyo-to; Yoshiaki Mima, Tokyo-to; Hiroshi Morishima, Tokyo-to, all of Japan

[73] Assignee: International Business Machines Corporation, Armonk, N.Y.

[21] Appl. No.: 606,461

[22] Filed: Mar. 4, 1996

Related U.S. Application Data

[63] Continuation of Ser. No. 503,676, Jul. 18, 1995, Pat. No. 5,522,024, which is a continuation of Ser. No. 260,809, Jun. 16, 1994, which is a continuation of Ser. No. 676,608, Mar. 28, 1991.

[30] Foreign Application Priority Data

Mar. 30, 1990 [JP] Japan .................................. 2-81473

[51] Int. Cl.$^6$ .............................. G06F 15/00; G06F 9/00
[52] U.S. Cl. ............................................. 395/334; 395/348
[58] Field of Search .................................. 395/155, 157, 395/159, 161, 600, 650, 700, 800

[56] References Cited

FOREIGN PATENT DOCUMENTS

| | | |
|---|---|---|
| 0343882A2 | 11/1989 | European Pat. Off. . |
| 1263818 | 10/1989 | Japan . |
| 2130663 | 5/1990 | Japan . |
| 0357058 | 3/1991 | Japan . |

OTHER PUBLICATIONS

"Macromarker Command Files", Appendix B, pp. 331–335.
"EMACS: The Extensible, Customizable, Self-Documenting Display Editor", Proceedings of the ACM SIGPLAN SIGOA Symposium on Text Manipulation Jun. 1981, Portland Oregon, pp. 300–325.
"Tempo II", Affinity Microsystems, Ltd. 1987.
IBM TDB "Keysave/Keyuse", vol. 29, No. 7, Dec. 1986, pp. 3157–3158.
IBM TDB "Method to Provide Customization of an Application User Interface by an End User", vol. 31, No. 1, Jun. 1988, pp. 337–338.
"A Method of Generating User-Defined Service Macro in an Icon-Based Environment", Systems and Computers in Japan, vol. 19, No. 11, Nov. 1988, pp. 70–77.
"A Guide to GUIs", Byte, Jul. 1989, pp. 250–257.

*Primary Examiner*—Mark R. Powell
*Assistant Examiner*—Huynh Ba
*Attorney, Agent, or Firm*—Mark E. McBurney; Richard A. Henkler

[57] ABSTRACT

A programming environment is provided in which an end user of one or more existing applications, e.g. integrated environment applications, can customize the applications with a unique user interface appearance. The environment consists of one application or a group of applications, a customization facility and a graphical editor. The customization facility records event streams from the user to the applications when they are run, and enables the user to compose a plurality of event streams into a story. The user generates a unique user interface appearance with graphical parts, e.g., boxes, arrows, icons, etc., using the graphical editor. The user then links the graphical parts, or objects of the user interface appearance to event streams or stories, and completes a programming mode. After programming, the user can make the customized application run by interaction with the new user interface appearance, for example picking the graphical objects on the appearance.

3 Claims, 8 Drawing Sheets

PROGRAM MODE FLOWCHART

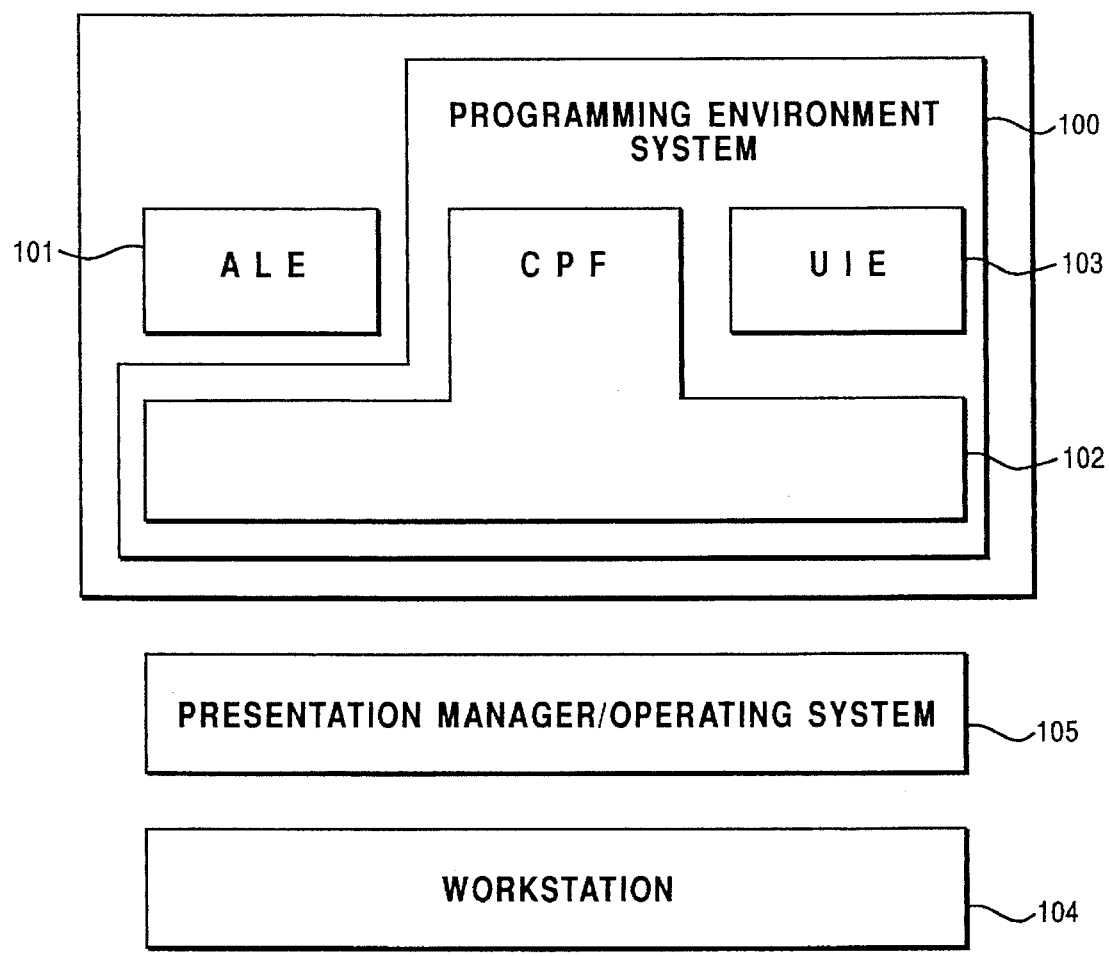
FIG. 1    OVERALL SYSTEM CONFIGURATION

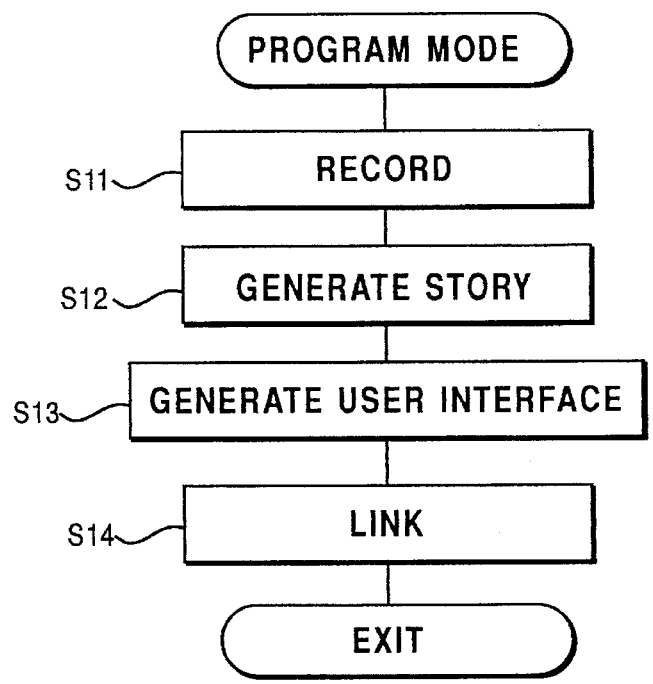
FIG. 2 PROGRAM MODE FLOWCHART
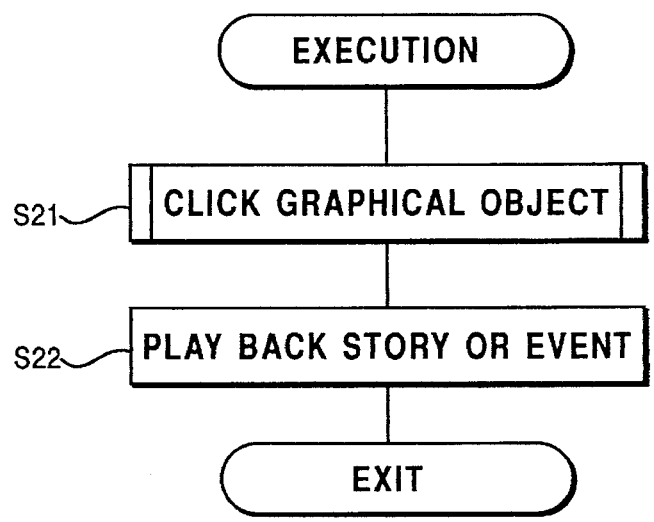
FIG. 3 EXECUTION MODE FLOWCHART

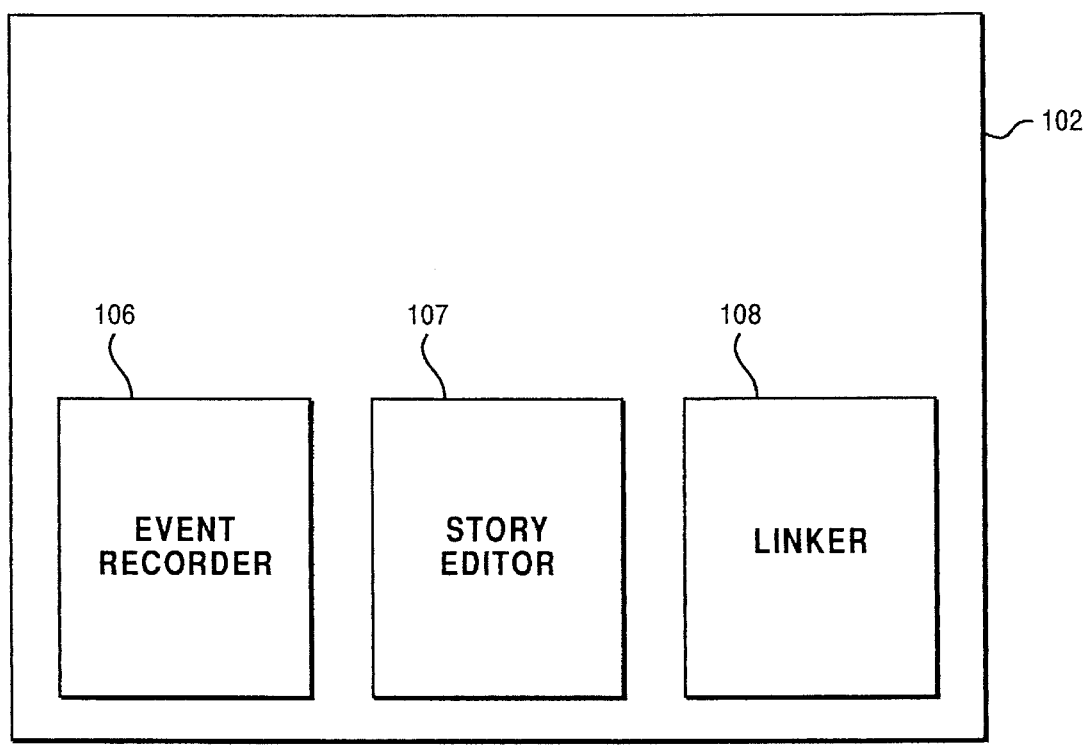
FIG. 4   CPF CONFIGURATION
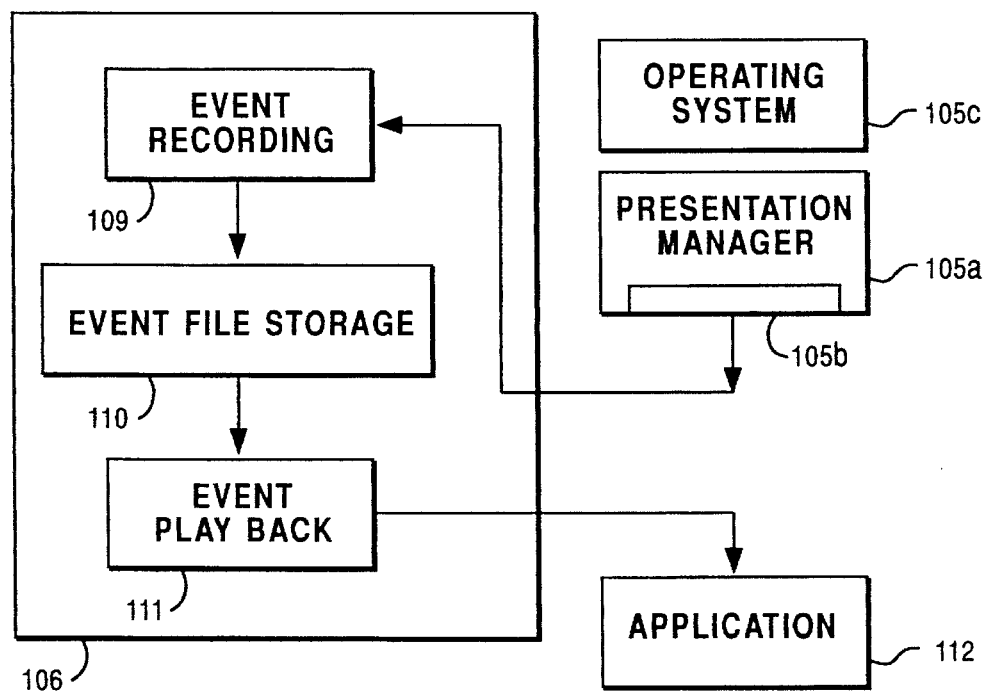
FIG. 5   EVENT RECORDER

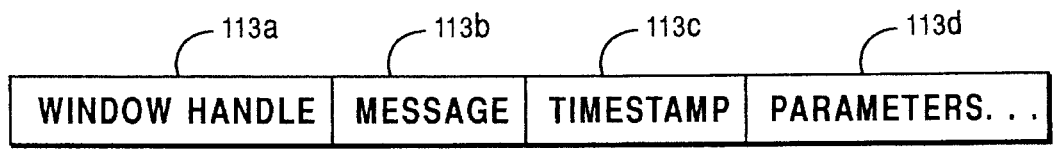
FIG. 6A
```
11   MU_INVOKEAP                ' MONTHLY SALES TABLE '
10   MU_LOCATE      _ _ _ _ _   545    474    932    624
10   WM_1BUTTONUP   0. 000      836    442      0      0
10   WM_1BUTTONDOWN 0. 940      784    514      0      0
10   WM_1BUTTONUP   0. 220      784    514      0      0
10   WM_MENUSELECT  1. 680       12    _ _ _    9     2a
12   MU_INVOKEAP                ' MONTHLY SALES GRAPH '
13   MU_LOCATE      _ _ _ _ _   625     80    418    264
13   WM_1BUTTONUP   0. 000      752     20      0      0
13   WM_MENUSELECT  2. 030       13    _ _ _    2     12
13   WM_1BUTTONDOWN 1. 840      646    110      0      0
13   WM_1BUTTONUP   0. 100      646    110      0      0
13   WM_MENUSELECT  1. 460       14    _ _ _    2     11
```
FIG. 6B
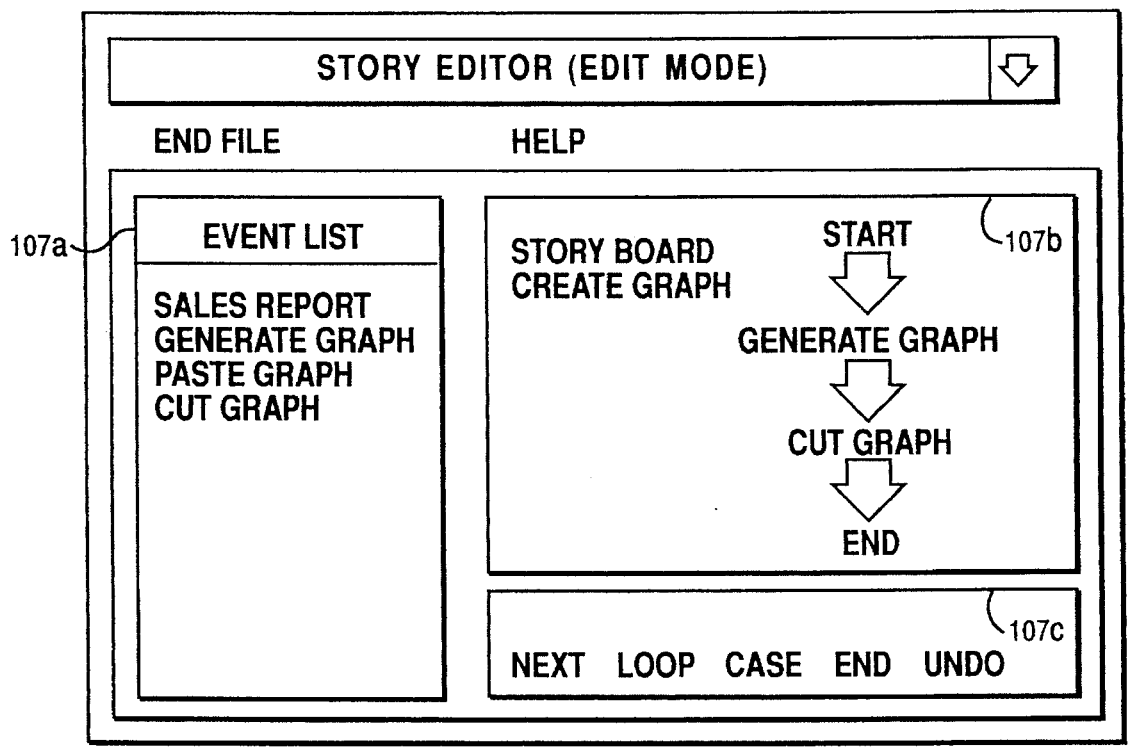
FIG. 7   STORY EDITOR

| LAYOUT OBJECT | PROCEDURE MODULE |
|---|---|
| OBJECT ID = 6 | STORY ID = 1 |
| OBJECT ID = 7 | EVENT ID = 2 |
| ... | ... |
| OBJECT IE = 10 | STORY ID = 6 |
| OBJECT ID = 3 | STORY IE = 2 |
FIG. 8  TABLE (RELATION TABLE)
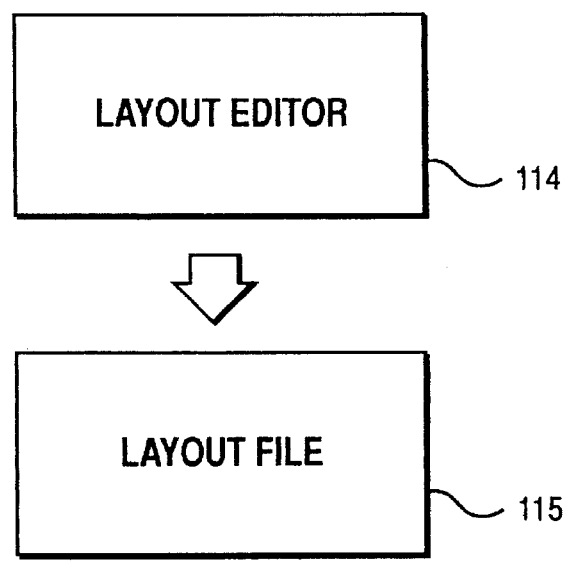
FIG. 9  OUTLINE OF USER INTERFACE ENABLER

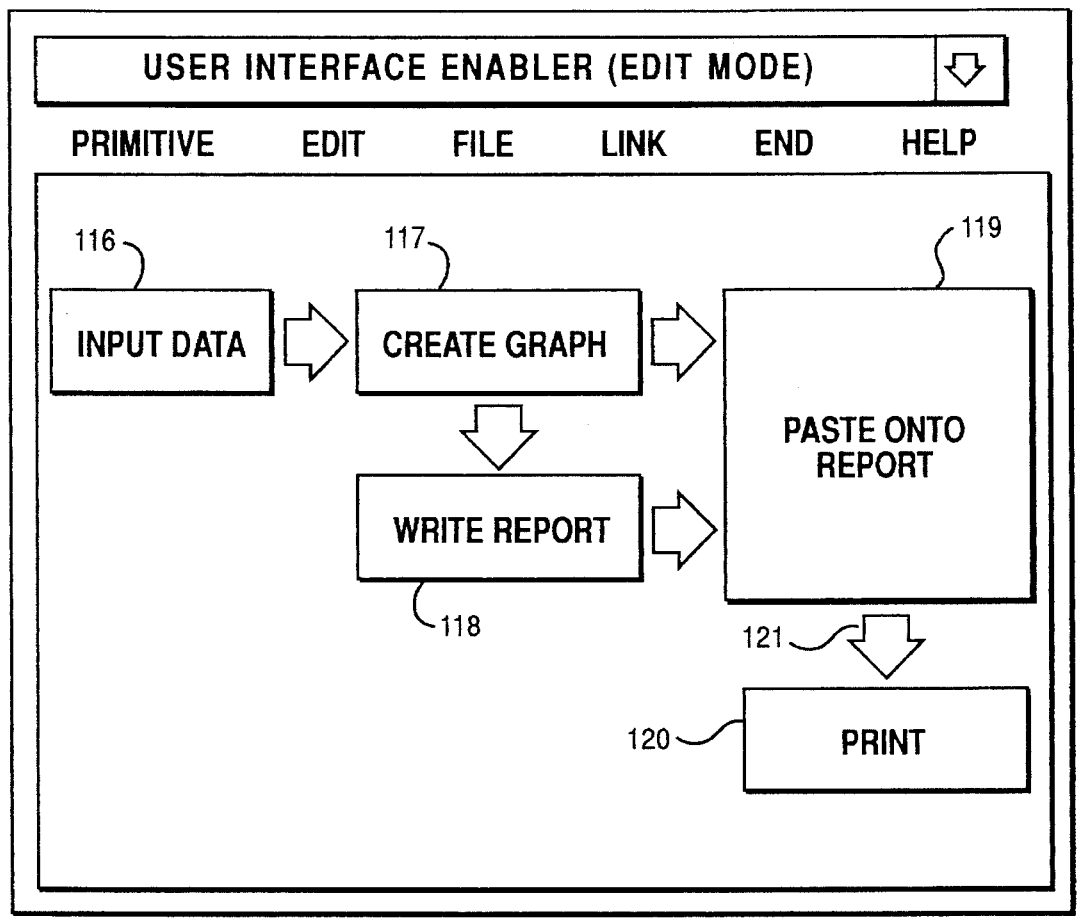
FIG. 10  LAYOUT (EXAMPLE)

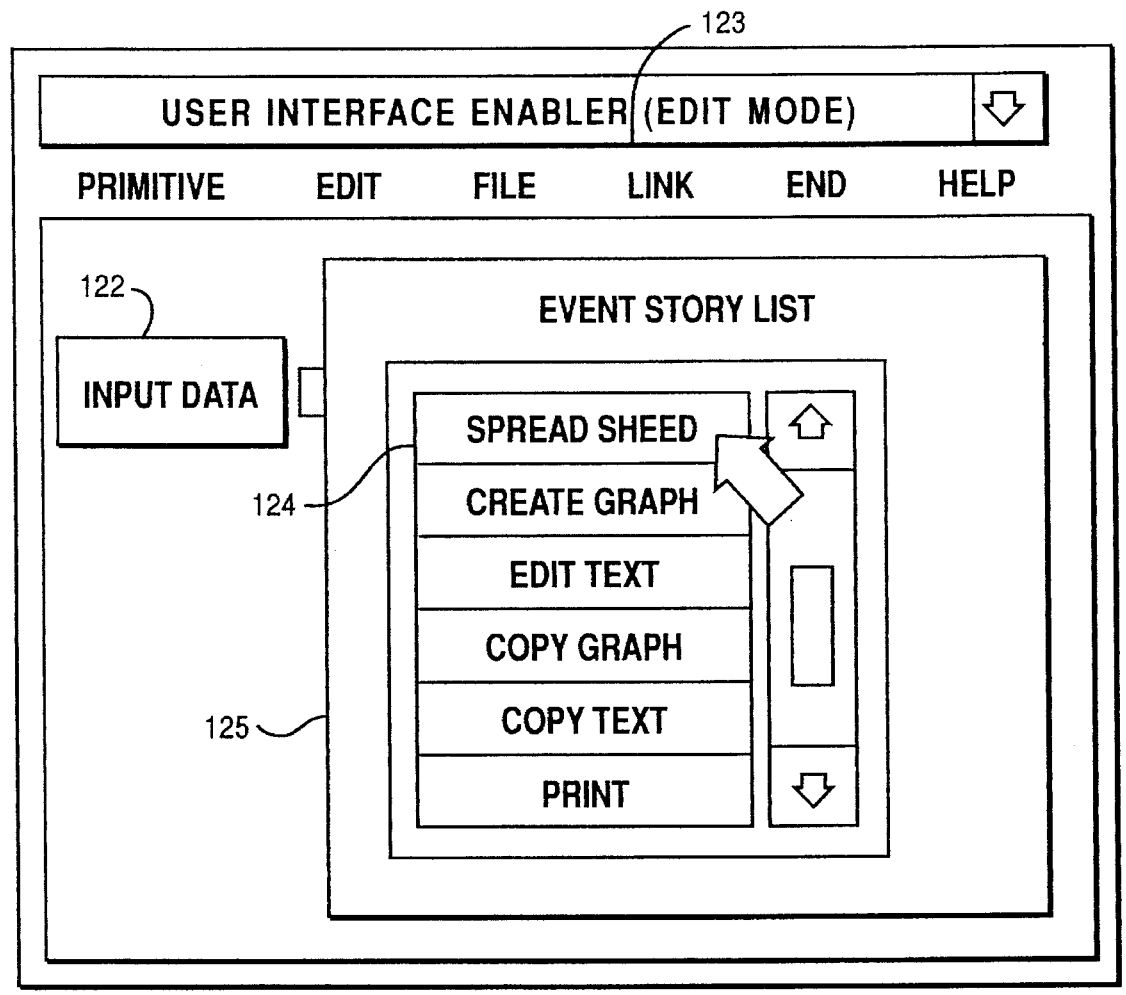
FIG. 11   LINK OPERATION (EXAMPLE)

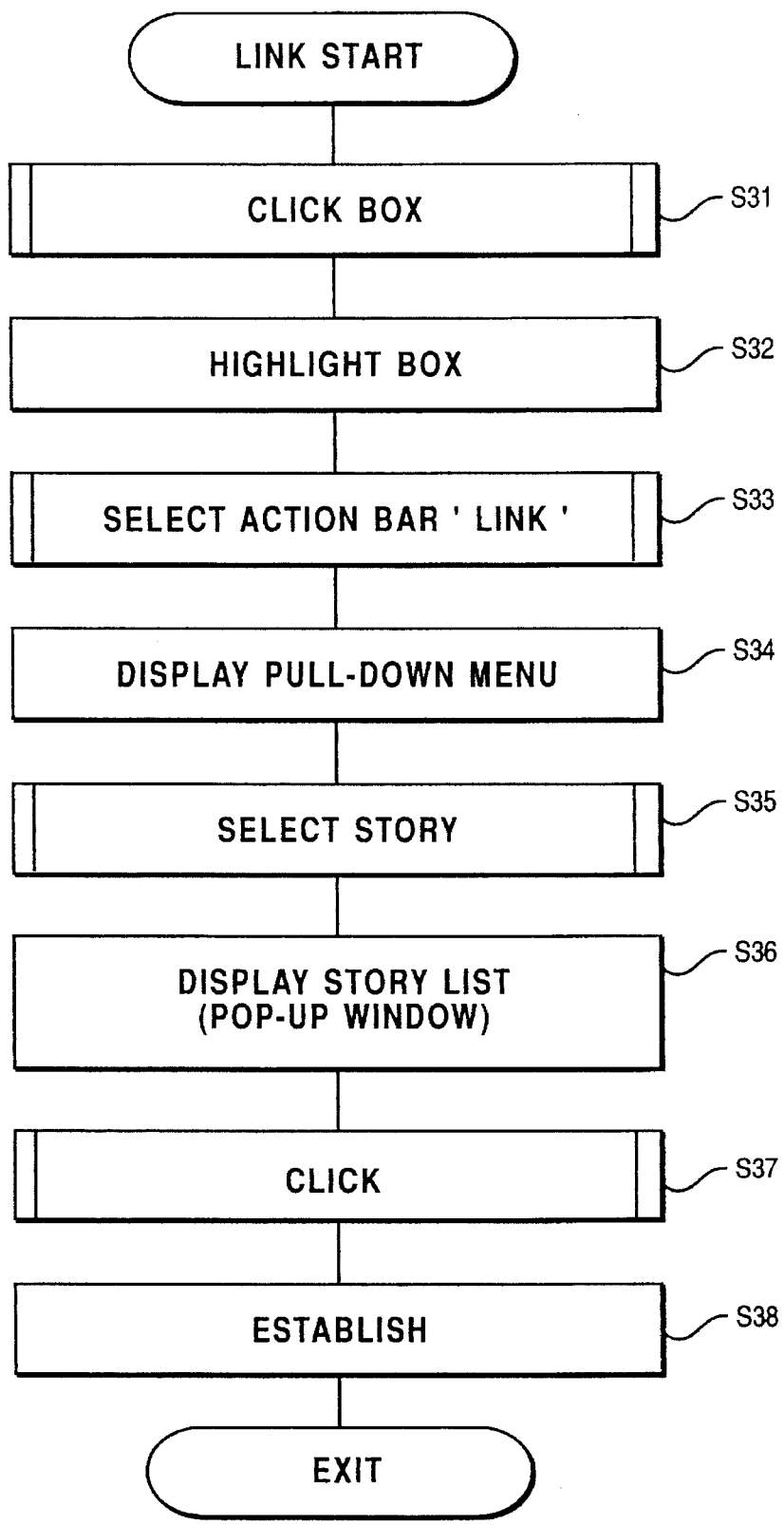
FIG. 12  LINK OPERATION (EXAMPLE)

PROGRAMMING ENVIRONMENT SYSTEM FOR CUSTOMIZING A PROGRAM APPLICATION BASED UPON USER INPUT

This application is a continuation of Ser. No. 08/503,676 filed Jul. 18, 1995 now U.S. Pat. No. 5,522,024 which is a continuation of Ser. No. 08/260,809 filed Jun. 16, 1994 which is a continuation of Ser. No. 07/676,608 filed Mar. 28, 1991.

BACKGROUND OF THE INVENTION

1. Field of the Invention

The present invention relates to a programming environment system, and, more particularly, to such a system capable of providing an optimal programming environment for customizing one or more existing applications to create a single new application.

2. Description of Related Art

With respect to a ready-made application, it is desirable and convenient to customize the application to be in tune with required work, given circumstances, and a particular user's preference. For example, there often arises cases where one or more applications are run following some routine procedure. If we could record such procedures as a single procedure, it would be possible to greatly alleviate a user's daily job burden.

However, the customization of an application requires a user to thoroughly master how to use the application concerned. Further, it should be noted that most editing languages are as difficult to use as standard programming languages, as exemplified by a customization language put forward by Richard M. Stallman in his articles, "Emacs: The Extensible, Customizable, Self-documenting Display Editor," Proceedings of the ACM SIGPLAN SIGOA Symposium on Text Manipulation, 1981, Portland, pp. 147–156. Editing languages of this type unavoidably put a heavy burden on general users who lack experience in programming, in spite of their clear advantage in descriptive facilities. To alleviate such a burden on the users, it is desirable to provide techniques which can be used even by unsophisticated users who lack experience in programing.

The following technique which alleviates the burden on users is currently known: recording the user's actions as a sequence of events and then regenerating the sequence of events, as if the user inputs those events again. A technique of this type is also employed in Tempo II (A trademark of Affinity Inc., U.S.A.), an execution support tool by Affinity Inc., U.S., and MacroMaker (utility name) of an operating system of Apple Inc., U.S.A.

With these conventional methods, however, customized applications are not necessarily easy for users to manipulate, in as much as recorded events are accessed through a label attached by a user or accessed with a function key assigned in advance to those recorded events.

Other conventional systems related to the present invention are: "Method to Provide Customization of an Application User Interface by an End User," IBM Technical Disclosure Bulletin, Vol. 31, No. 1, June 1988, pp. 377–378; Japanese Patent Application No. 1-31277; Japanese Patent Application No. 1-184880; and U.S. Japanese Patent Application No. 7,267,420. However, the above references are only intended to customize the appearance of a user interface or appearance (panel) transition. As techniques for recording and regenerating user key strokes, there exists another conventional system i.e., "KEYSAVE/KEYUSE," IBM Technical Disclosure Bulletin, Vol. 29, No. 7, December 1986, pp. 3157–3158.

SUMMARY OF THE INVENTION

In contrast to the prior art, an object of the present invention is accordingly to provide a programming environment that enables even ordinary users who lack experience in programming to customize applications with ease, and to enable those applications thus customized to be handled in a user-friendly manner.

In order to solve the above-mentioned problem, the programming environment system of the present invention comprises: means for monitoring a user's interaction to each application during the execution of said application and for recording one or more interaction data streams; graphics editing means for supporting generation of a graphical user interface screen; means for associating each graphical object on the graphical user interface screen with at least on of the interaction streams; means responsive to a user's interaction to one of said graphical objects on said graphical user interface screen, for automatically providing the corresponding interaction streams to the corresponding application, thereby producing the operation of said application.

BRIEF DESCRIPTION OF THE DRAWINGS

FIG. 1 is a general block diagram of an embodiment of the invention;

FIG. 2 is a flowchart illustrating the program mode of the embodiment in FIG. 1;

FIG. 3 is a flowchart illustrating the execution mode of the embodiment in FIG. 1;

FIG. 4 is a block diagram of the configuration of the customer programming facility (CPF) in FIG. 1;

FIG. 5 is a detailed block diagram of the event recorder in FIG. 4;

FIG. 6A and 6B show events dealt with in the event recorder;

FIG. 7 illustrates the operation of the story editor in FIG. 4;

FIG. 8 is a table generated by use of the linker in FIG. 4;

FIG. 9 is a configuration of the user interface enabler (UIE) in FIG. 1; and

FIGS. 10, 11, and 12 are the operation of the user interface enabler in FIG. 1.

DETAILED DESCRIPTION OF THE PREFERRED EMBODIMENTS

FIG. 1 shows the overall configuration of a system on which a programming environment system 100 of the present invention is implemented. In FIG. 1, the programming environment system 100 consists of an application logic enabler (ALE) 101, a customer programming facility (CPF) 102, and a user interface enabler (UIE) 103. The programming environment system 100 operates on a commercially available personal computing system, such as an IBM PS/2 model 55 workstation 104 (IBM and PS/2 are trademarks of International Business Machines Corporation, U.S.A.), and is implemented in software on a system program 105 consisting of an operating system and a presentation manager for managing windows (hereinafter referred to as the presentation manager/operating system).

The ALE 101, provides existing application functions, and actually one or one set of applications on the presentation manager/operating system 105. The ALE 101 is desirable to provide as many functions as possible, and usually includes a package of general-purpose office applications, such as a spread sheet, a word processor, a data base manager, a calculator facility, a business chart facility and the like. Of course, special-purpose applications, such as the kernel of a knowledge-based system or an inference engine of a decision making environment system, may be employed if desired. For example, two or more applications on the IBM presentation manager are commonly used as the ALE 101. Such applications include a package of general-propose office applications created by professional programmers, such as a spread sheet, a word processor, a data base manager, a calculator facility, and a business chart facility. Furthermore, the ALE 101 is so designed as to enable users to exchange data between these applications. The ALE 101 is thus enabled to provide various functions. When a window system of the SMART Series offered by IBM Corp., is used instead of the presentation manager, applications for the SMART Series are available. The SMART Series is a window-based systems for supporting execution of applications.

The UIE 103 is a graphics editor that edits user interface layouts (screens). The present invention allows the management of graphical objects on a user interface layout, newly generated by the UIE 103, and objects (event files and stories, which are described later) of procedure modules (logic modules) generated by the CPF 102, as described later.

The CPF 102 constitutes an essential part of the programming environment system of the embodiment which allows users to customize the applications of the ALE 101 to constitute a new application, and to associate the new application with a new interface layout.

Although the CPF 102 appears to the ALE 101 as if it were non-existent, i.e. CPF 102 is transparent, the CPF actually controls the exchange of information between the presentation manager/operating system 105 and the applications of the ALE 101.

The programming environment system 100 of this embodiment has a program mode (in FIG. 2) for customization and an execution mode (in FIG. 3) for activating the customized environment. The program mode and the execution mode may be implemented using a menu or key.

FIG. 2 is a flowchart of the program mode. The program mode will define tasks to be executed on applications before the execution of the tasks in the execution mode. As shown in FIG. 2, in the program mode, the user actually performs an operation on applications, which is then recorded (S11). Such an operation is called "RECORD." A series of operations is saved as data called an event file. One or more saved event files may be used to produce data in the form of stories by a story editor 107 (in FIG. 4) capable of describing a control structure including loops and branches (S12, FIG. 2). Both the event files and the stories are independently executable data. A user interface is defined to direct tasks to be executed (S13). The user interface is produced by combining graphical objects, and is finally associated with event files or stories by an operation called "LINK" (S14). Each step will be detailed later in reference to the drawings of FIGS. 4–12.

FIG. 3 is flowchart of the execution mode. The execution mode will reexecute the recorded operations using the user interface customized in the program mode. As shown in FIG. 3, in this mode as the user clicks a graphical object on the screen (S21), an event file or story corresponding to the graphical object is activated (S22).

The following explains sequentially the respective parts of the programming environment system of the embodiment.

FIG. 4 shows the configuration of the CPF 102. In FIG. 4, the CPF 102 consists of an event recorder 106, a story editor 107, and a linker 108. The event recorder 106 records as an event file a sequence of events entered in the program mode by a user as a recorded file and reproduces them in the execution mode. The editor 107 supports the user in generating a set of event files, or a story, by combining the recorded event files. The linker 108 associates the event files or story with a newly generated graphical object on the user interface.

FIG. 5 shows details of the event recorder 106. In FIG. 5, the event recorder 106 consists of an event recording section 109, an event file storage 110, and an event play back section 111.

The event recording section 109 functions to monitor and control an application program interface which an application program 112 uses to monitor a user's behavior. In this example, the event recording section monitors and controls information from the event queue 105b which is provided by the presentation manager 105a. That is, each time the application program 112 dequeues an event from the event queue 105b, the event recording section intercepts the event, and stores the sequence of events in the event file storage 110 as an event file. Strictly speaking, those events are intercepted by a function, called "input hook", provided by the presentation manager 105a. For details on the input hook, refer to "IBM Operating System/2 Programmer's Toolkit Version 1.1 Programming Guide", pp. 11–16 and pp. 11–18: (Operating System/2 is a trademark of IBM Corp.). In FIG. 5, the reference number 105c corresponds to the operating system.

FIG. 6A shows the structure of an event to be recorded and FIG 6B shows examples, wherein direct events by a mouse or a keyboard, and events by the system such as initiation of a menu, a window or an application are manipulated. Such event information consists of a window ID (Window Handle) 113a, an event type (Message) 113b, a time stamp (Timestamp) 113c, and other parameters (Parameters . . . ) 113d which are dependent on each message for their meaning.

Referring now to FIG. 5, there is an event play back section 111, which reproduces those events stored in the event storage 110 in the play back mode. When the application program 112 is about to dequeue an event from the event queue 105b, the event play back section 111 transfers a corresponding event in the event file storage 110 to the application program 112 as if the event came from the event queue 105b. Strictly speaking, the event play back section 111 reproduces such events by use of a send function for sending a message (WinSendMsg) that is one of the functions provided to achieve an inter-application communication function and the like. For details on the function of WinSendMsg, refer to IBM Operating System/2 Programmer's Toolkit Version 1.1 Programming Guide, pp. 3–6 and pp. 3–8.

FIG. 7 shows an example of a user interface screen of the story editor 107. As FIG. 7 shows, the story editor 107 provides the fields of an event list 107a, a story board 107b, and commands 107c which enable events to be edited visually. The story editor 107 enables one or more event files to be handled together. The registered event files can be referred by viewing the event list 107a. The event list 107a is generated on the story board 107b according to the commands 107c. One of the most important functions of the story editor 107 is to combine one or more event files into a larger executable record. Moreover, in a story, the commands 107c in the command field may be used to describe a control structure.

The linker 108 shown in FIG. 4 determines the mapping for prompting execution from a user interface. The mapping is implemented in a table as shown in FIG. 8. As shown in FIG. 8, the mapping table has attributes of layout objects and attributes of procedure modules (logic modules). The procedure module is an aggregate of event files and stories generated by the above-mentioned event recorder 106 and story editor 107, and is handled by event file ID or story ID. The layout objects are graphics elements such as boxes constituting the layout of a graphical user interface. The table enables the assignment of the graphical objects controlled by ID (called layout objects) as a user interface to activate procedure modules. The linker 108 is invoked to update the table. The user interface to invoke the linker 108 is generated and retained by the UIE 103, and will be explained in detail with respect to the UIE 103.

The UIE 103 is next explained. The UIE 103 is a graphics editor that defines a user interface. The display section is quite the same as a graphics editor of an ordinary WYSIWYG (What you see is what you get) type, so that users are allowed to use graphical components as they choose in displaying a user interface. The functional part of this graphics editor is the layout editor 114, by use of Which a user may define at will the appearance of a new user interface for use in the future.

FIG. 10 is an example of a layout generated by the layout editor 114. In this example, reference numerals 116, 117, 118, 119, and 120 are graphical objects constituted by grouping character strings and rectangles. Each graphical object is called a layout object, which is associated with a procedure module. FIG. 10 shows an example of a process of office work from writing to printing of a report created by the UIE 103. The arrow 121 here is not associated with any procedure module, but only serves as a guide for operational procedures. (Yet, the arrow 121 may be associated with some procedure module, if desired.)

These definitions of graphical information are handled in the form of layout files 115 (FIG. 9) that are used for storing the user interfaces.

The following describes how to associate these layout objects with procedure modules. FIG. 11 is an example of linking, and FIG. 12 shows its procedure. Referring now to FIGS. 11 and 12, a particular graphical object 122 to be linked is first clicked (S31), and the object is highlighted (S32). Then, if the "LINK" is selected on the menu 123 of the UIE 103 (S33), another menu 124 will appear to select "STORY" or "EVENT" (S34). In this example, the STORY is selected (S35). Then, a story list dialog box 125 appears (S36). By selecting required procedure module from the list with click (S37), a link is established (S38).

Linking may be attained in a similar operation in cases where a link from the layout object is repasted to another procedure module.

Furthermore, through associating one layout object with another, it is possible to execute a procedure module associated with one layout module after executing another procedure module associated with another layout module.

User interfaces generated in this way have an appearance as shown in FIG. 10. Such a user interface invokes a procedure module according to a table like that shown in FIG. 8 in response to a user's operation, supplied events sequentially to an application and automatically executes the user's desired tasks. This is the operation in the above-described execution mode, a detailed explanation of which is not repeated.

As has been explained so far, the present invention enables a user to record the their interactions (events) during the execution of an application, generate a new user interface appearance by use of a graphics editing function, and associate the objects on the user interface with the events. Thus, thenceforth the users have only to manipulate those objects on the use interface to reexecute their desired tasks.

The above-mentioned programming environment obviates the need for a user to acquire any programming skills, thus giving the user great convenience and enabling further operations to be executed on the user interface screen in a user-friendly manner.

Although certain preferred embodiments have been shown and described, it should be understood that many charges and modifications may be made therein without departing from the scope of the appended claims.

What is claimed is:

1. A computer program product comprising:

a computer usable medium having computer readable program code means embodied in said medium for creating a new application program from a plurality of existing application programs, said computer readable program code means comprising:

means for executing selected portions of said plurality of existing application programs;

means for recording, during said execution of said selected portions, a first data stream and a second data stream corresponding to a user's interaction with said plurality of existing application programs;

means for combining said first data stream and said second data stream into a single combined data stream using control commands for specifying the flow of execution for said combined data stream;

means for assigning a first graphical object to said combined data stream; and means for executing, in response to selecting said first graphical object, said selected portions according to the specified flow of said combined data stream.

2. The computer program product of claim 1 wherein said computer readable program code means further comprises:

means for recording, during said execution of said selected portions, a third data stream corresponding to a user's interaction with said plurality of existing application programs.

3. A computer program product comprising:

a computer usable medium having computer readable program code means embodied in said medium for creating a new application program from a plurality of existing application programs, said computer readable program code means comprising:

means for executing selected portions of said plurality of existing application programs;

means for recording, during said execution of said selected portions, a first, second, and third data stream corresponding to a user's interaction with said plurality of existing application programs;

means for combining said first data stream and said second data stream into a single combined data stream using control commands for specifying the flow of execution for said combined data stream;

means for assigning a first graphical object to said combined data stream;

means for assigning a second graphical object to said third data stream;

means for graphically associating said second graphical object with said first graphical object so that the user is directed to select said first and second graphical objects in a predetermined order; and means for executing, in response to selecting said first graphical object, said selected portions according to the specified flow of said combined data stream.

* * * * *